Oct. 8, 1968　　　　P. BOVARD ETAL　　　　3,405,050
APPARATUS FOR THE RADIOACTIVE DECONTAMINATION OF WATER
Filed June 8, 1964　　　　　　　　　　　　　　　2 Sheets-Sheet 2

INVENTORS
PIERRE BOVARD
ANDRÉ GRAUBY

*Bacon & Thomas*

ATTORNEYS 3,405,050
**APPARATUS FOR THE RADIOACTIVE
DECONTAMINATION OF WATER**
Pierre Bovard, Ecquevilly, and André Grauby, Clamart, France, assignors to Commissariat a l'Energie Atomique, Paris, France
Filed June 8, 1964, Ser. No. 373,461
Claims priority, application France, June 21, 1963, 939,031
5 Claims. (Cl. 204—240)

ABSTRACT OF THE DISCLOSURE

The present invention is a portable apparatus for the decontamination of drinking water containing radioactive pollutants. The apparatus comprises a closeable generally cylindrical outer housing confining a stacked array of various filters arranged between a water inlet tank having a perforated bottom and an outlet duct. A top, inert filter in the array is comprised of a suitable natural soil such as talc, kaolin, bentonite or vermiculite confined between a pair of rigid semi-permeable plastic membranes. Below the first inert filter is arranged an electrolytic filter system which is arranged above a second inert filter similar in design to the first filter but comprised of a mixture of diatomics, ion exchange resins or activated charcoal. Below the second inert filter is arranged a bacterial filter or some means of adding an appropriate disinfectant to the water before it is discharged.

---

Figure 1:
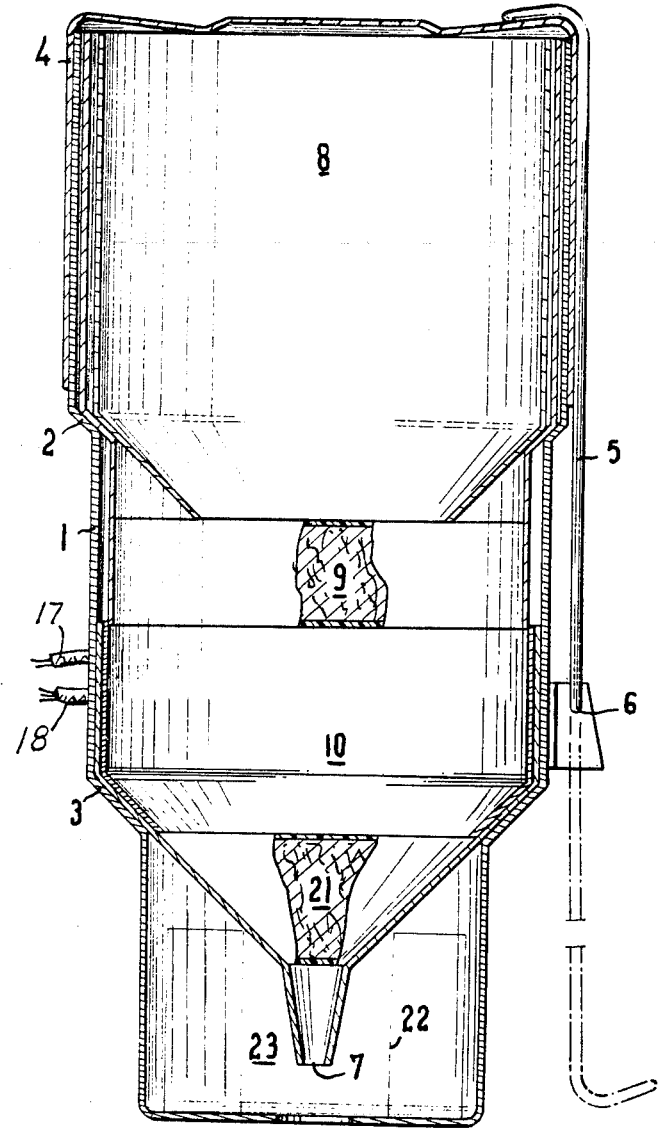

The present invention relates to an apparatus for the decontamination of drinking water which may have been polluted by radioactive elements. It is concerned more particularly with an apparatus which uses both the filtration properties or porous media for removing the radioactive elements and those of electrolysis in order to isolate in the water certain substances which are not retained by filtration.

Water contaminated by the radioactive elements can only be decontaminated by separating these elements from the water. Various methods are at present used which are as follows:

(1) A precipitation method which is used in water treatment work and which comprises the formation of large flocculates by coagulation. The water is then decanted and filtered. This precipitation generally carries along a certain number of effluents especially if the latter are already integrated in the substances in suspension which turbidify the water. This method is generally selective since one particular category or another of radioactive element is eliminated depending on the reagent chosen for the precipitation. This technique is fairly effective for heavy metals and alkaline earths but is more or less useless for ruthenium and iodine.

(2) The softening method using lime and sodium carbonate. This method has some success in eliminating radioactive elements from the water; it resembles the previous method, of which it can be considered as one particular case.

(3) Absorption by ion exchange which is an expensive process effective for certain radioactive elements. Therefore, it will have disadvantages similar to the aforesaid methods (limited range of action) and will in practice be applicable only to waters which are only very slightly loaded with salt.

(4) Special purification methods have also been used such as electrodialysis and precipitation by peat and by metallic powders.

However, these known processes for the decontamination of water are not effective except for one particular radioactive element or the other, and at the present time there is no universally effective method.

The object of the present invention is more especially to obviate the disadvantages inherent in each of the aforesaid processes, by providing an apparatus which uses a simple and specific combination of several elements, which apparatus can be portable and of small bulk, or of collective type with a greater output. It has simplicity as regards principle, construction, use and replacement of the elements which compose it which permits of general utilisation without requiring any particular technical formation.

In its broadest aspect the invention provides an apparatus for the decontamination of drinking water which may have been polluted by radioactive elements, characterised in that it is constituted by a set of inert, electrical and possibly bacterial filters, combined and arranged in accordance with the intended use in each particular case, an inert filter being formed by a column closed at its ends by rigid plastic sheets retaining an appropriate porous medium, and an electrical filter being formed by an electrolytic tank and electrodes made of non-toxic metals, the said filters being superposed so as to prevent any trickling effect along their walls.

The invention also provides, in addition to this main feature, in certain other features which will preferably be used at the same time, considered separately or in any of their possible combinations, which are more particularly as follows:

The porous medium of the inert filter is formed of materials selected from mineral elements, more particularly processed elements, having a high exchange capacity such as talc, kaolin, bentonite, vermiculite, and other clays, as well as from the diatomics, resins or activated carbon, The electrodes of the electrical filter are broadly speaking in the form of two coaxial cylinders immersed in the said tank the bottom of which may advantageously be inclined, a water outlet being provided in the highest portion of the said tank bottom, The said apparatus may be advantageously formed, successively in the direction of flow of the water to be decontaminated, by a first inert filter containing a raw material the exchange capacity of which is at least equal to 10 milliequivalents per 100 grams which frees the water of strontium, caesium, barium and plutonium, by adsorption and ion exchange, by an electrical filter which fixes more particularly the anions such as iodine which are not retained to any great extent by the preceding filter, and also the cations which will have escaped the latter, by a second inert filter containing a mixture of double resins, anionic and cationic, and activated carbon, with a higher exchange capacity than that of the first, and which acts as an additional security measure with regard to the preceding filters, absorbs certain dissolved gases such as iodine, krypton, xenon, argon, and lowers the salt contents released by the said first inert filter, and finally by a bacterial filter of a suitable known type which may be replaced by any appropriate disinfectant or treatment.

Figure 2:
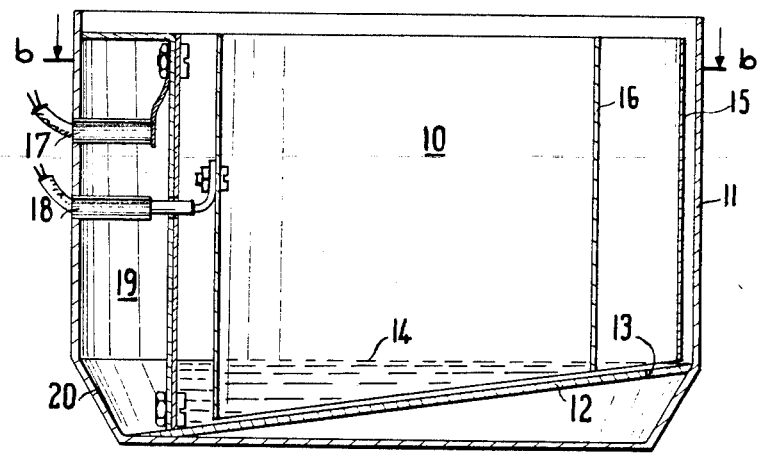
Figure 3:
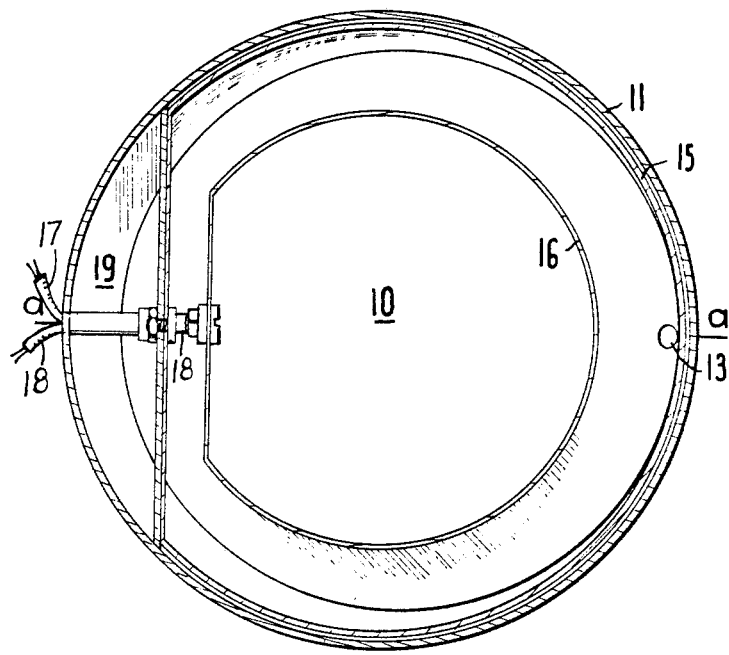

The invention will now be described by way of example with reference to the accompanying drawings in which:

FIGURE 1 is a vertical sectional view of a decontamination apparatus according to the invention, FIGURES 2 and 3 are respectively a vertical sectional view on the line *aa* and a horizontal sectional view taken on *bb* of an electrical filter used in the decontamination apparatus according to the invention.

As FIGURE 1 shows, the apparatus according to the invention is formed by a substantially cylindrical container 1 comprising two portions 2 and 3 of reduced diameter, and closed by a cover 4 which can be held in place by a lever 5 pivoted at 6 on the wall of the container 1.

The container 1 contains various filters which will be discussed hereinafter, and the decontaminated water is discharged at 7.

The object of the apparatus according to the invention is to free the water of the radio active products which are most dangerous to human health, according to certain rules which have been recommended in this respect by the competent authorities.

The radioactive elements are in solution in drinking water in the form of electro-positively or electro-negatively charged ions: anions and cations. The elements which are dangerous to health come under these two categories:

Cations: caesium, strontium, barium, yttrium, plutonium, zirconium, niobium.

Anions: iodine and ruthenium which may also be in cation form.

The succession of the various filters which will be arranged in the container 1 will eliminate the various aforesaid elements.

The apparatus therefore comprises:

(1) a first tank 8 constituting the receptacle for the water to be decontaminated, (2) a first inert filter 9 in which the tank 8 fits at the level of the reduced diameter portion 2, this filter containing raw mineral whose exchange capacity is at least equal to 10 milliequivalents per 100 grams.

This filter acts by means of two properties;

Adsorption which is in relation to grain size,

Ionic exchange, characterised by the exchange capacity of the mineral.

Adsorption affects all the elements whereas ionic exchange affects more especially the cations.

For minerals whose exchange capacity is greater than 10 milliequivalents, the second effect will be predominant. Decontamination at this stage, will, therefore, be directed particularly at the cations.

Thus, the function of this filter is as follows:

(a) To fix 90% of the dangerous cations (in cases where the exchange capacity is of about 15 milliequivalents).

(b) To fix a variable percentage of the anion, which is dependent on the mineral used and the composition of the water.

(c) To arrest by simple filtration the particles in suspension and to fix a certain quantity of cations which are not dangerous to human health but are liable to saturate the subsequent filters and to reduce the effectiveness and working life thereof.

The mineral selected should be resistant to leaching: the speed of percolation is regulated so as to facilitate decontamination to the maximum extent; and the material configuration of the filter reduces wall effects.

This filter frees the water more particularly of the following radioactive elements: strontium, caesium, barium, plutonium. Of the most dangerous, there is still iodine to be eliminated. It will be the function of the following element to arrest it.

(3) An electrical filter 10 in which the preceding filter 9 is fitted and which is shown in detail in FIGURES 2 and 3. As these figures show, this filter is composed of a tank 11 having an inclined bottom 12. At the highest portion of this bottom 12 there is situated a water outlet 13 which maintains the minimum water level 14 in the tank 11. In this tank 11 there are immersed two substantially cylindrical electrodes 15 and 16 connected by any suitable means to the terminals 17 and 18 of a current source (provided for example by a battery). Between the external electrode 15 and the tank 11 there can be provided a sealing-tight chamber 19 in which the current lead-in terminals 17 and 18 are situated, a conical shoulder 20 enabling the electrical filter 10 to bear on the reduced diameter portion 3 of the container 1.

This electrical filter will cause the electrolytic deposition of ions on the anode or on the cathode depending on their charge.

The main object of this filter is to fix the anions which are not retained to any great extent by the preceding element, more particularly iodine. Its effect will also be felt on the cations, and in this case it will have a safety function.

After a certain operating time, certain ions may go back into solution, especially if the composition of the treated water varies at the successive uses of the apparatus.

In order to remedy this possible disadvantage, a second inert filter has been provided.

(4) A second inert filter of high capacity containing double resins and activated carbon, which is housed in the lower housing 21 of the apparatus.

Ion exchange and adsorption will once more be effected at this stage. This filter fulfils various functions which are connected with its position in the general layout and its composition:

(a) Additional radiological security for perfecting the action of the preceding filters, which requires a high exchange capacity and duality of the resins (anionic and cationic).

(b) Fixing of certain dissolved gases by adsorption: iodine, krypton, xenon and argon.

(c) Avoiding risks of returning into solution in the preceding filters and the end of a certain working life.

(d) Guarantee of drinkability by lowering the salt contents (in cases where ions are liberated during ionic exchanges at the first element).

This filter should be situated in the third position both owing to its high exchange capacity and to the risks of blocking and saturation which are more probable than in the first position.

(5) A bacterial filter which will also be situated in the lower housing 21, below the preceding inert filter. This filter uses conventional techniques known in the art and ensures complete drinkability of the treated water, in cases where the original water is doubtful from the bacterial point of view. Bacterial decontamination can also be obtained by adding a disinfectant or by appropriate treatment.

The batteries such as 22 which are intended to supply the electrical filter 10 can advantageously be situated in the space 23 between the lower portion of the container 1 and the lower housing 21.

The main advantage of the invention resides in the well-planned succession of the various filters and their practical design which permits of the production of apparatus which are simple and easy to operate.

The filters are very simple to handle and their form is such that there cannot be any errors in assembly. Moreover, depending on the risks which are to be covered, the apparatus could be rapidly modified by changing the constituent or constituents of the filters.

In the logical construction of an apparatus, the first element should always be placed at the head; it represents the coarse filter which carries out the greater part of the work, leaving the finishing work to the following finer elements.

The decontamination factors obtained in various radioactive contamination cases are of about 100 to 1,000, the lowest factors corresponding to the lowest contaminations (200 disintegrations per minute and per cm.$^3$).

The output of an individual apparatus is about one litre per hour; it can operate for a period of time which in the msot disadvantageous cases is 10 days, depending on the conditions and instructions which are most often formulated by experts in radioactive protection.

The output of collective apparatus is dependent on their size, protection against radiation being ensured either by screens or by signals, if necessary.

We claim:

1. Apparatus for the decontamination of drinking water containing radioactive pollutant materials including:
first inert filter means for partially removing said pollutant materials by ion exchange and adsorption;
electrical filter means for partially removing said pollutant materials by electrolysis;
second inert filter means for partially removing said pollutant materials by ion exchange and adsorption;
bacterial decontamination means; and
closeable, container means for confining said filter means in juxtaposed relationship whereby water supplied to said apparatus will pass sequentially through said first filter means, said electrical filter means, said second filter means and said bacterial decontamination means.

2. Apparatus as described in claim 1 wherein said container means includes;
a tank having an open top and a perforated bottom removably confined within an end portion of said container means for receiving water to be decontaminated; and
means for draining said decontaminated water from said apparatus.

3. Apparatus as described in claim 2, wherein:
said first and second inert filter means are each comprised of filter material confined within a housing having ends closed by a semi-permeable plastic material.

4. Apparatus as described in claim 3, wherein:
said electrical filter means includes an open topped electrolytic tank having a water outlet in a highest portion of an inclined bottom;
a cylindrical anode of non-toxic metal; and
a cylindrical cathode of non-toxic metal concentric with said anode;
said anode and said cathode being partially immersed in water within said electrolytic tank and adapted to be energized by a source of direct current.

5. Apparatus as described in claim 3, wherein;
said first inert filter means includes materials selected from the group consisting of talc, kaolin, bentonite, vermiculite; and
said second inert filter means includes materials selected from the group consisting of diatomics, ion exchange resins and activated carbon.

References Cited
UNITED STATES PATENTS

| | | | |
|---|---|---|---|
| 887,666 | 5/1908 | Lester | 204—152 |
| 1,038,122 | 9/1912 | Hagg | 204—152 |
| 1,392,524 | 10/1921 | Puiggari et al. | 204—149 X |
| 1,978,447 | 10/1934 | Austerweil et al. | 210—38 X |
| 2,681,885 | 6/1964 | Briggs | 204—151 |

HOWARD S. WILLIAMS, *Primary Examiner.*

A. C. PRESCOTT, *Assistant Examiner.*